United States Patent [19]

Burns, Jr. et al.

[11] 4,294,480
[45] Oct. 13, 1981

[54] SAFETY GUARDS AND METHODS FOR MANUALLY FEEDING WORKPIECES TO ASSEMBLY MACHINES

[75] Inventors: William S. Burns, Jr.; William M. Sankey, both of Shreveport, La.

[73] Assignee: Western Electric Company, Incorporated, New York, N.Y.

[21] Appl. No.: 117,687

[22] Filed: Feb. 1, 1980

[51] Int. Cl.³ .................. B25D 17/10; F16P 1/00
[52] U.S. Cl. .................................. 294/131; 2/16
[58] Field of Search ............... 29/559, 278, 281.1; 294/25, DIG. 2, 131, 1 R; 2/16, 17; 74/612; 81/3; 269/1

[56] References Cited

U.S. PATENT DOCUMENTS

| | | | |
|---|---|---|---|
| 2,436,507 | 2/1948 | Ellwood | 2/17 |
| 2,438,792 | 3/1948 | Sandrik | 2/17 |
| 4,079,979 | 3/1978 | Schweizer | 294/33 |
| 4,093,297 | 6/1978 | Reiber | 294/131 |

Primary Examiner—Milton S. Mehr
Attorney, Agent, or Firm—R. F. Kip, Jr.

[57] ABSTRACT

A safety guard (10) and method of manually feeding a workpiece (11), such as a flat rectangular terminal board, to an assembly machine (13), such as a conventional eyeletting machine. The guard includes a hollow, generally hemispherical shield (20) having a slot (21) in a front face thereof, into which an end portion (A) of a workpiece may be inserted so that the working portion of the workpiece extends from the front of the shield toward the machine. The operator inserts his or her hand into a rear opening of the shield and securely grips the end portion of the workpiece between thumb and forefinger, so that the workpiece may freely be fed manually to the assembly machine, but the shield protects the operator's hand from injury by the machine details.

6 Claims, 3 Drawing Figures

SAFETY GUARDS AND METHODS FOR MANUALLY FEEDING WORKPIECES TO ASSEMBLY MACHINES

TECHNICAL FIELD

This application relates generally to safety guards and methods for manually feeding a workpiece to an assembly machine, and particularly to such guards and methods in which an end portion of a workpiece may be securely gripped by an operator's fingers for feeding the workpiece between movable machine elements and in which the guard shields the operator's hand from the machine elements.

BACKGROUND OF THE INVENTION

In the past, in various assembly operations, such as in the use of eyeletting machines for staking eyelets into holes in electrical terminal boards, it has been the practice for an operator to grip one end portion of a workpiece, such as a corner of a terminal board, between thumb and forefinger, and then to manually feed the workpiece to selected positions between the machine details for the assembly operation, such as between a stationary anvil and a movable ram of an eyeletting machine. In such operations, it is possible for the operator to have a finger pinched or otherwise scraped by the moving machine details during such assembly operations.

SUMMARY OF THE INVENTION

A specific object of this invention is to provide a safety guard and method of assembly, which permits an operator to securely grip an end portion of the workpiece as in the prior process described above, with the same "tactile feel" as in the prior process, but so that the operator's hand is positively shielded from possible injury by the machine elements during the assembly operation.

Another object is to provide a versatile safety guard that will permit handling of a variety of workpieces, such as terminal boards of different sizes and shapes, and that will comply with safety requirements with respect to "pinch point" locations at which the operator's fingers can be pinched.

Other objects are to provide a safety guard that is low in cost, light in weight, and simple and efficient to operate.

With the foregoing and other objects in view, a safety guard and method of feeding workpieces, in accordance with certain features of the invention includes a hollow shield having an opening at one end into which an operator's hand can be inserted. An end portion of the workpiece is inserted into the shield through a slot in the opposite end of the shield, so that the operator may manually grip the end portion of the workpiece within the shield for feeding the remainder of the workpiece to an assembly machine, wherein the shield precludes injury to the operator's hand during the assembly operations.

Preferably, the shield is provided with a horizontal shelf adjacent to the slot for supporting the end portion of the workpiece so that the workpiece may be gripped against the shelf between the operator's thumb and forefinger. A finger grip is preferably located beneath the shelf for receiving the operator's forefinger in the gripping position.

Other objects, advantages and features of the invention will be apparent from the following detailed description of a specific embodiment thereof, when read in conjunction with the accompanying drawings.

DETAILED DESCRIPTION

Figure 1:
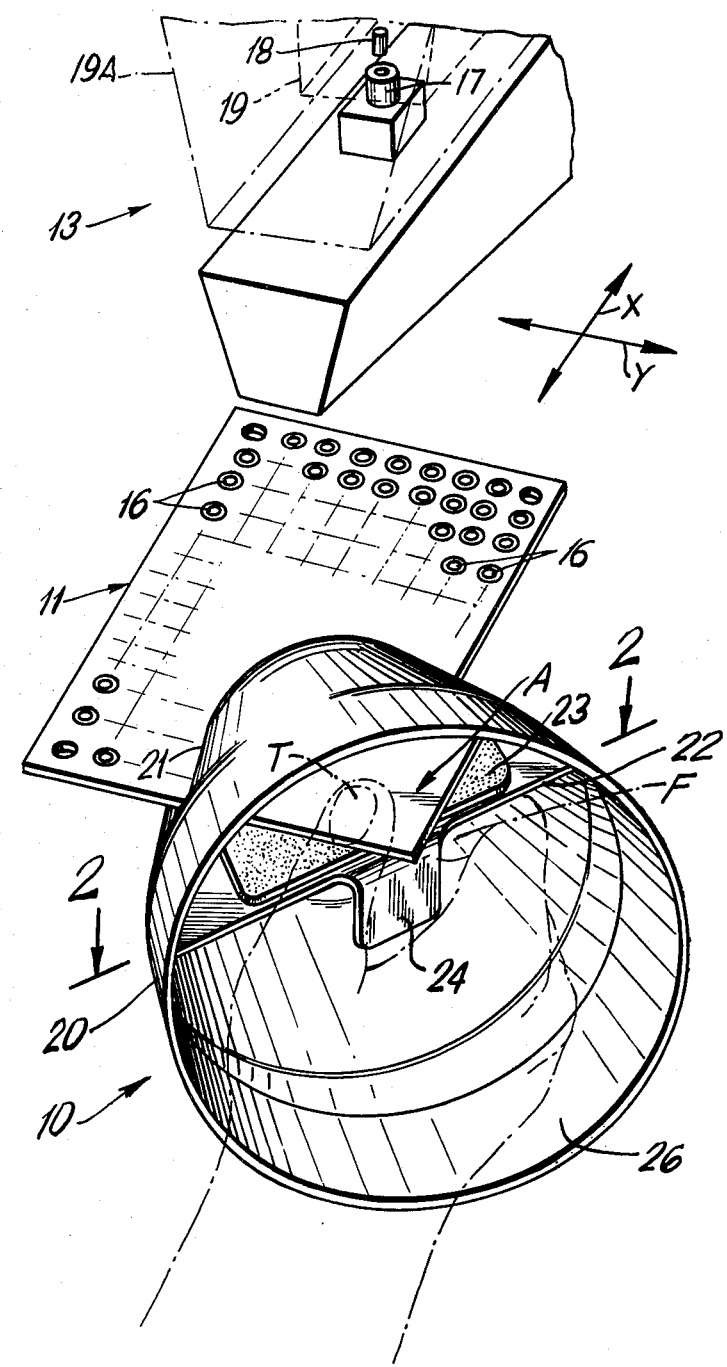
FIG. 1 is a perspective view of a safety guard in accordance with one specific embodiment of the invention, and illustrating the manner in which a terminal board is gripped by an operator for feeding to an eyeletting machine.

Referring now in detail to the drawings, and particularly to FIG. 1, a safety guard 10 in accordance with one specific embodiment of the invention is designed to permit an operator to grip an end portion of a workpiece, such as a flat, rectangular terminal board 11, to be fed manually (arrows X-Y) to selected positions with respect to an assembly machine, such as a conventional eyeletting machine 13. As previously mentioned, in the past, it has been customary for the operator to grip such a board 11 by one corner (A) between thumb and forefinger and then to manually position the board within the eyeletting machine 13 so as to align selected holes 16 in the board between a fixed eyeletting anvil 17 and pins 18 carried by a movable ram 19, for a conventional eyeletting operation. As discussed above, this technique is potentially hazardous because of the possibility that the thumb or fingers could be stricken or pinched by the movable eyeletting details when the ram is operated. A conventional machine guard (19A) cannot be designed to exclude fingers without excluding the workpiece from the operating point. This machine guard (19A) can be designed, however, to exclude the subject safety guard with the operator's hand inside.

Figure 2:
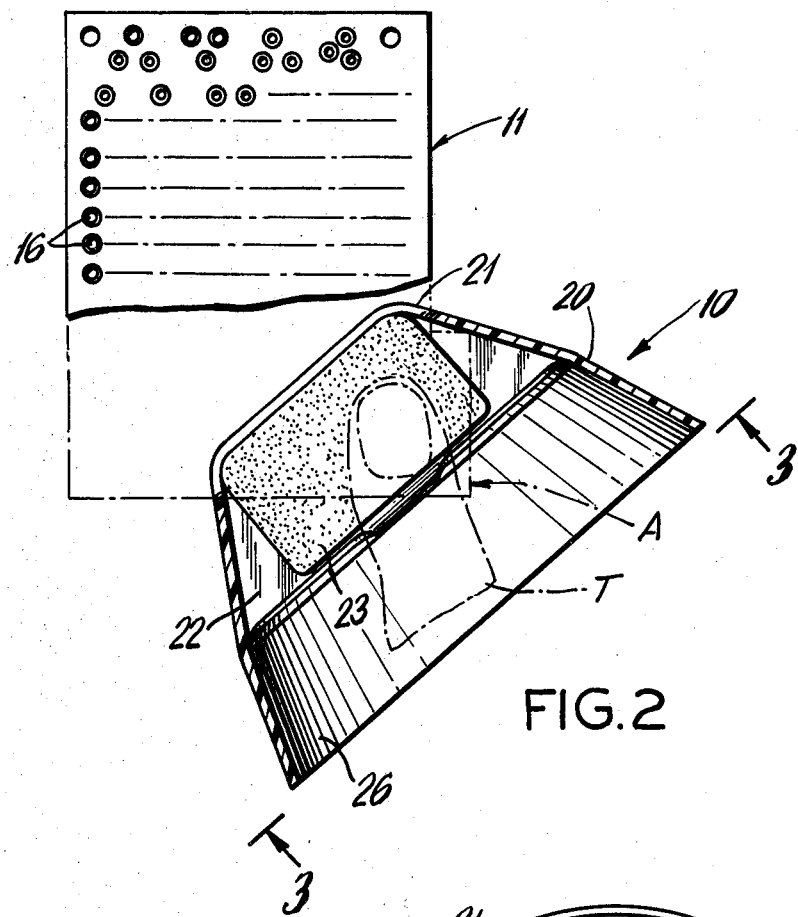
FIG. 2 is a top horizontal section through the guard, along line 2—2 of FIG. 1.

The safety guard is designed to allow manual grasping and manipulation of such workpieces with respect to a machine in essentially the same manner as before and with the same "tactile feel," while positively precluding the possibility of injury to the operator's hand. The guard includes a hollow molded plastic housing or shield 20 having a somewhat flattened, generally hemispherical shape, as shown, and having a slot 21 in a front face thereof (the face pointing toward the machine 13 as viewed in FIGS. 1-2), for receiving the corner A of the board 11 to be held, in a secure position within the shield 20 as shown in FIGS. 1-2. Preferably, the slot 21 has a width (left-to-right in FIG. 3 when the guard is arranged in the operating position illustrated with the slot extending horizontally and facing toward the eyeletting machine) such that a desired area of the corner of the board may be inserted from the the front face into the slot and into the interior of the shield. The desired area is that which is required for the operator to grip the corner of the board, but with the major working area of the board 11 extending outward horizontally from the front face of the guard for the assembly operation. In general, the frontal slot 21 is preferably formed of such size and shape with respect to the workpiece that only a predetermined end portion of the workpiece desired for manual gripping can be inserted into the slot, after which side portions of the workpiece lodge against the sidewalls of the slot, so that the desired end portion of the workpiece can be manually grasped by the operator within the shield, as shown in FIG. 1.

Figure 3:
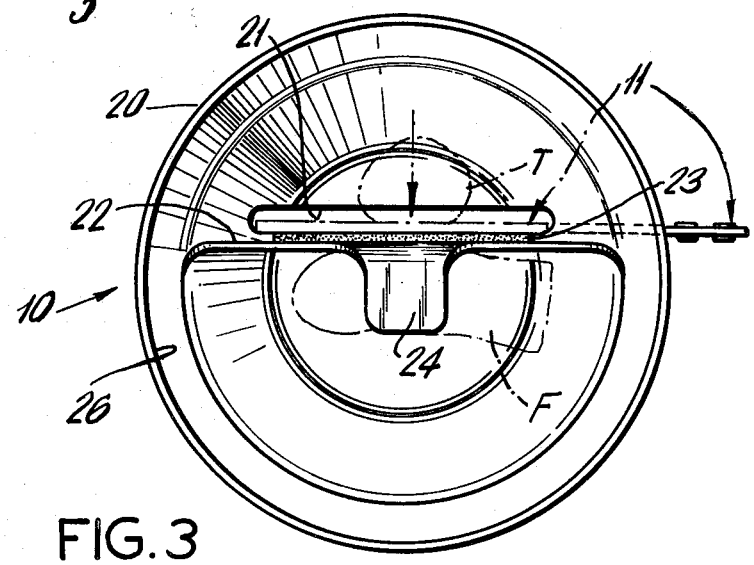
FIG. 3 is a rear view, looking into the guard along line 3—3 of FIG. 2.

Extending rearwardly from the slot 21 toward the operator, and coplanar with the lower edge of the slot, is a thin horizontal shelf 22 that is covered with a friction pad 23 of a material such as cork or rubber for receiving and supporting the under surface of the corner of the board within the shield 20. In operation, the operator inserts his or her hand into an opening 26 at the rear end of the guard, from the rear in FIG. 1, with the thumb (T) placed atop the corner of the board, as indicated in FIGS. 1-3, and with the forefinger (F) fitting under the shelf 22 and curled about a finger grip 24 extending downwardly from the rear center of the shelf 22, as indicated in FIG. 3. With this arrangement, the corner of the board may be securely gripped against the shelf 22 between thumb (T) and forefinger (F), and the board can then be manipulated safely with essentially the same tactile feel as previously.

This operator-held safety guard allows use with a wide variety of sizes and shapes of workpieces, whereas fixed guards attached to the machine, or automatic feed machinery, are not so versatile, in addition to being considerably more expensive. Fixed guards, attached to the machine to exclude fingers from any "pinch points", will also exclude a workpiece from the point of operation. With the subject safety guard in use, the machine can be more loosely guarded, the workpiece easily inserted into the point of operation, and the operator's fingers excluded. In addition, this type of safety guard meets safety "pinch point" requirements for machinery such as eyeletting machines, while simultaneously permitting the highly versatile, free-manual type of feed operation as before. Also, where it is required that both hands be positively inaccessible under the machine details, the nonholding hand, normally the left, may be "tethered" as is well known, so as to permit operation of start buttons and other functions in handling the workpieces, but not to permit extension of the opposite hand into the machine.

In view of the foregoing description, it should be apparent that there has been provided a low-cost, simple and efficient safety guard and method of assembly that permits safe manual gripping of the end portion of a workpiece within the guard 10, while permitting free manual feeding of the extending portion of the workpiece to the assembly machine. While one specific embodiment of the invention has been disclosed in detail above, it should be apparent that various modifications may be made from the specific details described without departing from the spirit and scope of the invention.

What is claimed is:

1. A safety guard that permits manual gripping of an end portion of a workpiece to be fed to an assembly machine, which comprises:

a hollow shield having an opening at one end thereof into which an operator's hand can be inserted, the shield having a slot at the opposite end arranged for receiving the end portion of the workpiece within the shield, the shield further having means for supporting the end portion of the workpiece within the shield and for permitting manual gripping of the end portion by the operator within the shield, while the shield precludes injury to the operator's hand when the workpiece is fed to the assembly machine.

2. A safety guard as recited in claim 1, wherein the supporting means includes a horizontal shelf adjacent to the slot and arranged for supporting the end portion of the workpiece within the shield, so that the end portion may be securely gripped by the operator against the shelf between thumb and forefinger.

3. A safety guard as recited in claim 2, wherein the shield further includes a finger grip extending downward from the shelf for receiving the operator's forefinger in the gripping position.

4. A safety guard permitting manual gripping of an end portion of a flat, rectangular workpiece to be fed to an assembly machine, which comprises:

a hollow, generally hemispherical shield having an opening at a rear end thereof into which an operator's hand can be inserted, the shield having a slot at a front end thereof for receiving the end portion of the workpiece within the shield, the shield having a horizontal shelf for supporting the end portion of the workpiece within the shield so that the end portion of the workpiece within the shield may be securely gripped by the operator against the shelf between thumb and forefinger, the shield having a finger grip extending downward beneath the shelf for receiving the operator's forefinger in the gripping position.

5. A method of manually gripping a portion of a workpiece for safe manual feeding of the workpiece to an assembly machine, which comprises:

inserting a predetermined end portion of the workpiece through a slot in a front face of a hollow shield member so that the end portion of the workpiece extends within the shield and so that a working portion of the workpiece to be fed to the assembly machine extends outward from the front face of the shield; and then inserting a hand into a rear-end opening of the shield and manually gripping the end portion of the workpiece within the shield, so that the gripped workpiece may thereafter be fed manually to the assembly machine, while the shield precludes injury to the operator's hand during the assembly operation.

6. A method as recited in claim 5, wherein the end portion of the workpiece is gripped against a horizontal shelf within the shield adjacent to the slot between thumb and forefinger, the forefinger being curled about a finger grip within the shield beneath the shelf.

* * * * *